July 7, 1942.   R. C. ZUCKERMAN   2,288,985
METHOD AND APPARATUS FOR DIGGING BEETS
Filed Jan. 6, 1940
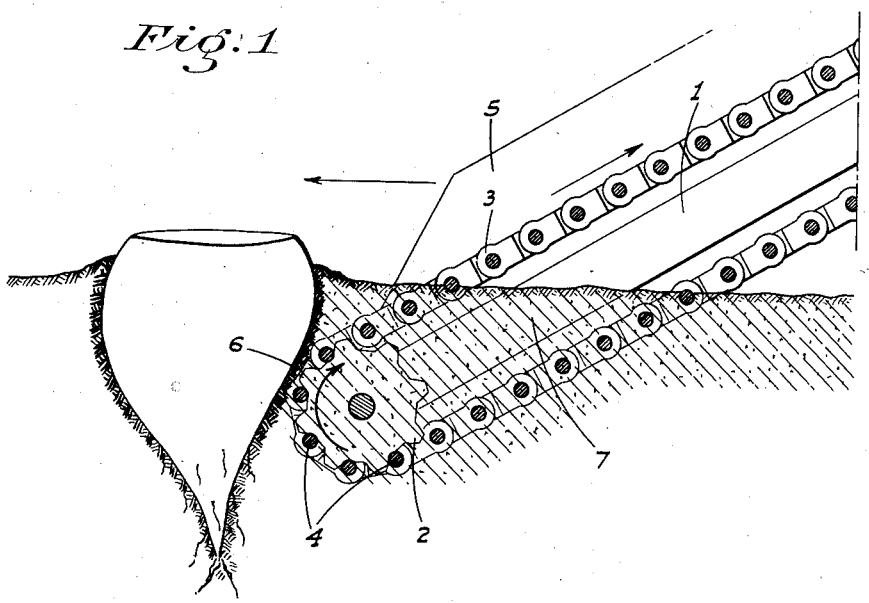
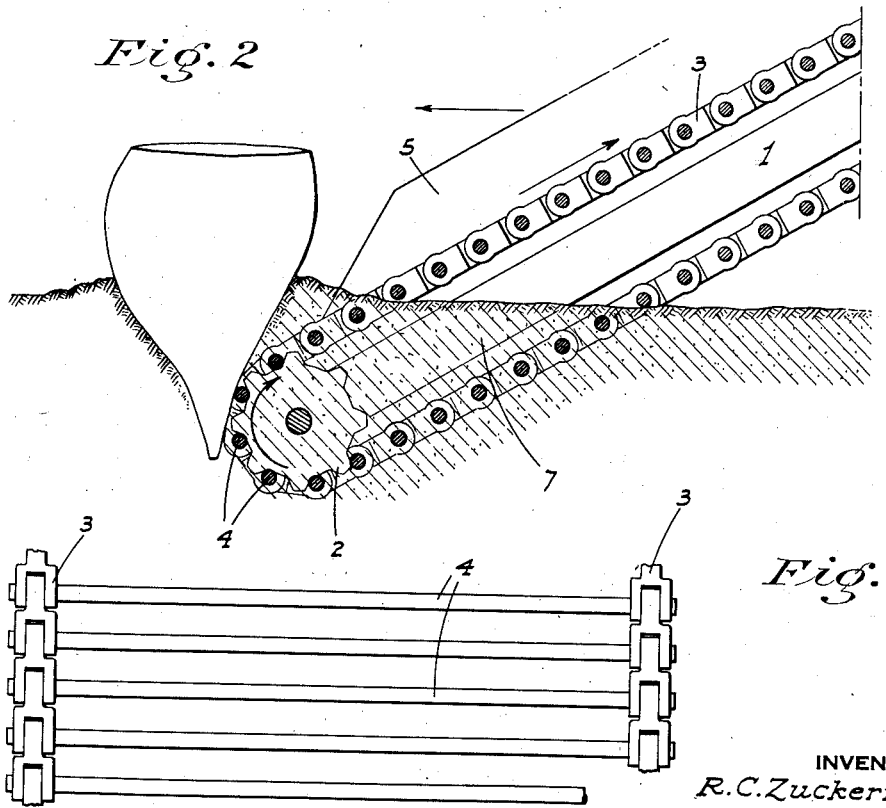
INVENTOR
R. C. Zuckerman
BY
ATTORNEYS Patented July 7, 1942

2,288,985

UNITED STATES PATENT OFFICE 2,288,985

METHOD AND APPARATUS FOR DIGGING BEETS

Roscoe C. Zuckerman, Stockton, Calif.

Application January 6, 1940, Serial No. 312,709

6 Claims. (Cl. 55—9)

This invention relates to the beet harvesting industry, and particularly to the digging or lifting of the beets from the ground.

At present, practically all the equipment for this purpose includes a sloping blade, as for instance shown in my Patent No. 1,748,746, dated February 25, 1930, or plow elements adapted to be drawn or pushed through the ground below the beets and arranged to force the beets upwardly and onto the elevator associated with the lifting element. Sometimes the lifting device is supported from a standard which, projecting into and being drawn through the ground, fractures the soil and consumes considerable power in thus moving it, since it must depend to a depth sufficient to pass under the tail of the beets. Frequently such lifting devices fracture or cut through the beets near the tail, leaving the lower portion in the ground.

Beets are substantially wedge-shaped, or so that they are largest at the top and taper thence more or less gradually to the bottom or tail. It is the main object of my invention to make use of this natural form of the beets by providing a method of lifting the beets, and an apparatus for carrying out the same, by means of which the beets are lifted without loss of any portion of the beets, even to the tails, with a minimum of power, and so that the soil instead of being broken into clods, is left in a finely pulverized condition.

The advantages gained by this method and apparatus are an increase in the aggregate tonnage of the beet crop as dug, economy of operation, and since the soil is pulverized, it sifts through the drapers as the lifted beets are elevated and thus very little, if any, dirt is deposited with the beets in the trucks accompanying the harvester.

These objects I accomplish by means of such structure and relative arrangement of parts as will fully appear by a perusal of the following specification and claims.

In the drawing similar characters of reference indicate corresponding parts in the several views:

Figure 1 is a somewhat diagrammatic fragmentary side section of my improved beet lifting apparatus, shown in operation and as almost in contact with a beet to be lifted.

Figure 2 is a similar view, showing a beet being lifted.

Figure 3 is a fragmentary plan of the combination digger and draper.

Referring now more particularly to the characters of reference on the drawing, the beet lifting apparatus used in carrying out my method comprises a vertically swingable draper supporting frame 1 mounted in connection with a supporting vehicle as shown in said patent, or in any other suitable manner, and so that the frame may depend into the ground at its forward end any desired distance. An endless driven draper and digger unit is mounted on this frame, and includes supporting sprockets 2 of relatively small diameter (as compared with a full-size beet) chains 3 engaging the spockets and round rods or bars 4 extending between the links of the chains. In practice, the sprockets are about four inches in diameter, and the rods are about one-half inch in diameter and are spaced about one and one-half inch between centers. Upstanding sideboards 5 on the frame retain the beets on the draper after they are dug. The apparatus may of course be made so as to dig any desired number of rows simultaneously.

The draper is driven at a relatively high speed so that the upper run moves rearwardly, so that the rods move upwardly about the sprockets from below. To be effective, it is not necessary for the lower ends of the draper to depend more than six inches into the ground, so that a minimum amount of ground is penetrated, and power to advance the machine as a whole and drive the draper is reduced to a minimum.

When the draper is thus depressed, the foremost upwardly moving rods on the draper are disposed under the overhang of the beets, where they first come in contact with the adjacent soil about the beet which has been compressed somewhat as indicated at 6, by the growth and lateral swelling of the beet. The rods exert an upward pressure against this compressed soil on the adjacent side of the beet (as well, of course, as on the beet itself), while the soil on the opposite side remains undisturbed for the time being.

The result is that with the continued fast driving of the draper and the accompanying relatively slow forward movement thereof, each beet in turn as engaged by the rods is raised straight up and literally "popped" out of the ground, to then fall onto the upper run of the draper, without the rods actually coming into bruising contact with the beets. The beets thus come out of the ground without breaking or disturbing their entire root system, and with the beets intact, including their top roots or tails. The tonnage of the harvested crop is thus increased.

The rods, being small and spaced apart, come in contact with small quantities of soil, and since the rods are moving through the ground at high speed, the soil 7 through which they pass is thoroughly churned and pulverized.

As a result, any dirt which may be thrown onto the upper rearwardly moving run of the draper, immediately sifts through and back onto the ground, instead of remaining with the beets to be deposited therewith into the truck behind.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A method of digging beets having a downwardly tapering form, comprising exerting a combined horizontally advancing and upward pressure against each beet on the back side thereof and intermediate its ends but below the upper end of the taper and so as to impart a direct upward movement to the beet from its rooted position.

2. An apparatus for digging beets consisting of an endless horizontally movable conveyor and digging unit, said conveyor having vertically spaced upper and lower runs, means supporting the unit so that the unit will be disposed at a downward slant with its forward end below ground level at a predetermined depth, the upper run being adapted to move rearwardly; the unit including transversely extending conveyor elements of relatively small cross sectional area and spaced apart a distance less than the diameter of a beet.

3. An apparatus for digging beets consisting of an endless horizontally movable conveyor and digging unit, said conveyor having vertically spaced upper and lower runs, means supporting the unit so that the unit depends at a downward slant with its forward end below ground level at a predetermined depth, the upper run moving rearwardly; the unit including transversely extending spaced conveyor-forming rods of relatively small diameter positioned for direct lifting engagement with the back side of a beet to be dug.

4. An apparatus for digging beets consisting of an endless horizontally movable conveyor and digging unit, said unit including transversely extending spaced conveyor-forming rods of relatively small diameter and flexibly linked together, a supporting frame for the unit and direction-changing elements for the conveyor at its forward end; the conveyor being arranged with vertically spaced upper and lower runs and with its upper run moving rearwardly, and the frame being disposed with a downward slant to its forward end and the direction changing elements projecting entirely below ground level in position to cause the rods passing about said elements to come into direct lifting engagement with a beet.

5. A method of digging beets of downwardly tapering form from a row comprising exerting a continuously applied upwardly and direct rearwardly moving force in the direct line of the row against the rear side of the beets below the point of greatest diameter of the beets and at the same time horizontally advancing said force.

6. A beet digging apparatus comprising means to exert a continuous upward and direct rearward force against the beets on their rear side below ground level and below the point of greatest diameter of the beets and means to advance said first named means horizontally as said force is exerted.

ROSCOE C. ZUCKERMAN